United States Patent [19]

Salgado

[11] Patent Number: 5,579,087
[45] Date of Patent: Nov. 26, 1996

[54] CONSTRUCTING A MULTI-SEGMENT PRINT JOB FROM MULTIPLE LOCAL OR REMOTE SOURCES USING A NETWORK INTERFACE

[75] Inventor: David L. Salgado, Victor, N.Y.

[73] Assignee: Xerox Corporation, Stamford, Conn.

[21] Appl. No.: 586,333

[22] Filed: Jan. 16, 1996

Related U.S. Application Data

[63] Continuation of Ser. No. 287,817, Aug. 9, 1994, abandoned.

[51] Int. Cl.⁶ ................................................. G03G 21/00
[52] U.S. Cl. ........................... 355/202; 355/200; 358/296
[58] Field of Search .................................. 355/200, 202, 355/204, 208, 210, 244; 358/296, 448, 450, 452; 395/101, 112, 114

[56] References Cited

U.S. PATENT DOCUMENTS

| | | | |
|---|---|---|---|
| 4,970,554 | 11/1990 | Rourke | 355/202 |
| 5,081,494 | 1/1992 | Reed et al. | 355/202 |
| 5,165,014 | 11/1992 | Vassar | 395/112 |
| 5,181,162 | 1/1993 | Smith et al. | 364/419 |
| 5,206,735 | 4/1993 | Gauronski et al. | 358/296 |
| 5,212,786 | 5/1993 | Sathi | 395/600 |
| 5,243,381 | 9/1993 | Hube | 355/204 |
| 5,247,372 | 9/1993 | Tsutamori et al. | 358/452 |
| 5,287,194 | 2/1994 | Lobiondo | 358/296 |
| 5,371,837 | 12/1994 | Kimber et al. | 395/114 |
| 5,402,527 | 3/1995 | Bigby et al. | 395/101 |

*Primary Examiner*—Sandra L. Brase
*Attorney, Agent, or Firm*—Ronald F. Chapuran

[57] ABSTRACT

A technique of constructing a multi-segment print job from multiple local and remote sources on a network using a network interface to identify print job segments and location of segments on the network by entering a start build print job function at the network interface, identifying each segment of the print job including segment location, specifying print job characteristics such as quantity and quality for each segment, entering an end build print job function at the network interface, and identifying a printing device on the network whereby each segment of the print job is accessed and distributed to the printing device to complete the multi-segment print job.

22 Claims, 7 Drawing Sheets

CONSTRUCTING A MULTI-SEGMENT PRINT JOB FROM MULTIPLE LOCAL OR REMOTE SOURCES USING A NETWORK INTERFACE

This is a continuation, of application Ser. No. 287,817, filed Aug. 9, 1994, David L. Salgado, and entitled "CONSTRUCTING A MULTI-SEGMENT PRINT JOB FROM MULTIPLE LOCAL OR REMOTE SOURCES USING A NETWORK INTERFACE", which is now abandoned.

BACKGROUND OF THE INVENTION

The present invention relates to constructing a multi-segment print or fax job from multiple local or remote sources on a network using a network interface to identify print job segments, location of segments, and print characteristics of segments, as well as selecting a printing device.

As networks and systems become more integrated and more complex, the amount and speed of information flow between users creates a need for more versatile and more efficient control over the information flow process. Current systems for sending a document or set of documents to a remote station require the operator to know designated limitations beforehand or require the operator to scroll through or review various features and limitations related to the document being sent or related to the device or receiver requirements at the receiving station.

Protocols defining integrated system behavior for devices such as printers, scanners, workstations and facsimiles, are well known. These protocols define how the systems should integrate across networks. Operational transparency across networks and device platforms, provide users with an increasingly integrated and transparent system environment. In this environment the manipulation of information (such as documents) is transparent to users as a result of the various network protocols that define the manner in which devices manipulate information.

In the prior art, as disclosed in U.S. Pat. No. 5,212,786, in a network environment, a stream of data, including various job related instructions and image data, expressed in terms of a page description language is captured, decomposed and stored for printing. A network job can have its origin in a remote client, such as a workstation, or a print server with a storage device. In either case, jobs provided at an image input terminal are preferably stored in a mass memory, such as the multiple disk arrangement.

As disclosed in U.S. Pat. No. 5,206,735, stored jobs are arranged in a job or system file in anticipation of being printed at an image output terminal. U.S. Pat. No. 5,181,162 discloses a document management and production system in which documents are represented as collections of logical components or objects, which objects may be combined and physically mapped onto a page-by-page layout. Objects may also contain further data ("attributes") specifying logical or physical relationships to other objects or to the document as a whole, characteristics relating to the appearance of the content, or access restrictions.

Also, U.S. Pat. No. 5,243,381 discloses a method which facilitates "demand printing" by use of one or more control sheets. In one example, a control sheet, including machine readable code, such as bar code, can be developed to reference a location at which each segment is stored in an electronic printing machine with a scanner. To form a document of the segments, the control sheets are scanned, in a predetermined order and read by the scanner. In response to the reading, the segments are retrieved from their respective storage locations, some of which locations may be remote, and printed in the predetermined order.

The concept of electronically storing a plurality of segments in a single folder, and printing those segments from the folder, has been used in both distributed and centralized printing systems. For example, a Xerox® 6085 workstation is adapted to store a plurality of documents in a folder for printing at a suitable network printer. Additionally, a DocuTech printer, manufactured by Xerox Corporation, is capable of printing two segments from a single print file. In operation, the first segment is delivered to a first output area and the second segment is delivered to a second output area so that hand collation is required.

It is also known as disclosed in pending application Ser. No. 07/130,929, D/92365, assigned to the same assignee as the present invention, to utilize a user interface to automatically distribute information to a receiver on a network using devices (such as printers and facsimile machines) and communication channels (such as electronic mail) defined in a receiver profile.

A difficulty with the aforementioned systems, however, is the inability to construct a job from several electronic documents dispersed on a network using a standard network user interface and to be able to designate or select a given printer device on the network to complete the job. The electronic documents can exist locally or remotely and can be designated with specific attributes, combined at the designated printer, and reproduced in a common package.

It is an object of the present invention, therefore, to provide a new and improved user interface with the capability to selectively tailor a job based upon multiple local or remote document sources to be completed at a designated remote finishing stations. It is still another object of the present invention to provide a technique to initiate selection of multiple remote electronic documents for combination with selective attributes in a given format at a printing station for reproduction in a common document. Still another object of the present invention is to provide user selected document identifiers for assembling remote documents at a selected finishing station for printing with designated attributes. Other advantages of the present invention will become apparent as the following description proceeds, and the features characterizing the invention will be pointed out with particularity in the claims annexed to and forming a part of this specification.

SUMMARY OF THE INVENTION

The present invention is a network user interface with display screen for constructing a multi-segment print job from multiple sources on the network including a start build switch at the interface to initiate a start build print job function, selectors on the display screen to identify each segment of the print job including segment location on the network, indicators on the display screen to identify print job characteristics for each segment, and a printing device selected at the interface whereby each segment of the print job is accessed and distributed to the printing device to complete the multi-segment print job.

BRIEF DESCRIPTION OF THE DRAWINGS

For a better understanding of the present invention, reference may be had to the accompanying drawings wherein the same reference numerals have been applied to like parts and wherein.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DESCRIPTION OF EMBODIMENT

Figure 1:
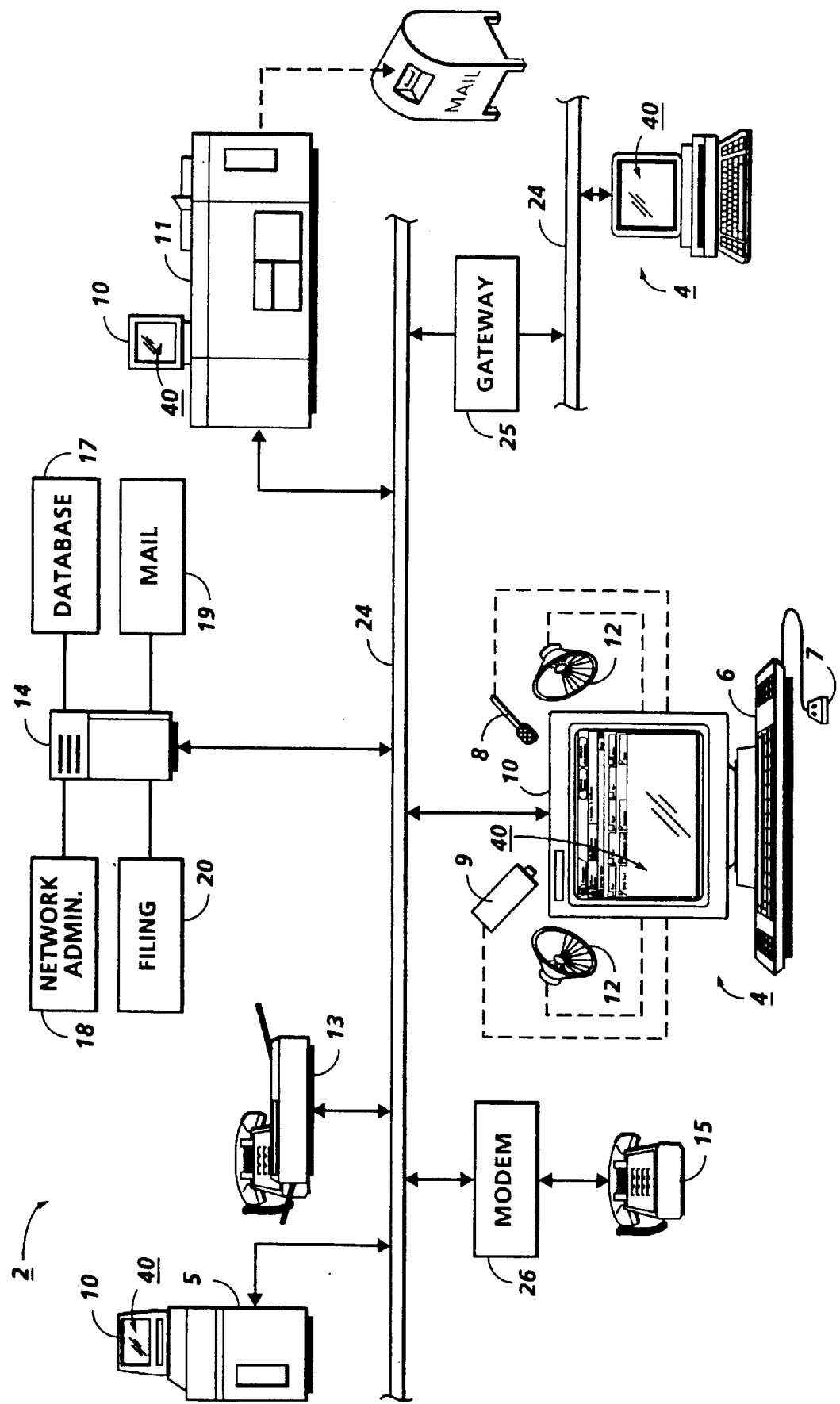
FIG. 1 is an illustration of a system environment incorporating the present invention.

Referring now to the drawings and in particular to FIG. 1, an exemplary multimedia device information system or network 2 including work station 4 enables users to communicate in a transparent and device independent manner. Multimedia system 2 can be implemented using a variety of hardware platforms and includes devices for input including scanner or digital copier 5, keyboard 6, pointing device or mouse 7, microphone 8, and video camera 9. The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18, mail system 19 (e.g. email, voice mail) and data storage and retrieval system 20, and can be physically configured using optical drives, hard drives, floppy drives and/or tape drives. The relational database system 17 provides systems with fast query and retrieval of data.

Work station 4 operates in a collaborative environment, where users at different Work stations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment Work station 4 is connected to other systems and devices through local area network (LAN) 24, gateway 25, and/or modem 26. In distributed systems, a number of Work stations extend distributed processing and storage capabilities to each other, by providing for example redundant storage or a single mounting of a unique application.

Work station 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Globalview TM ("GV") software available from Xerox Corporation, which uses abstractions such as a desktop, inbasket, outbasket and documents. It should be noted that the described system is exemplary, and that FIG. 1 could include any number of additional devices such as printers or facsimile machines or other networks connected to LAN 24.

Figure 2:
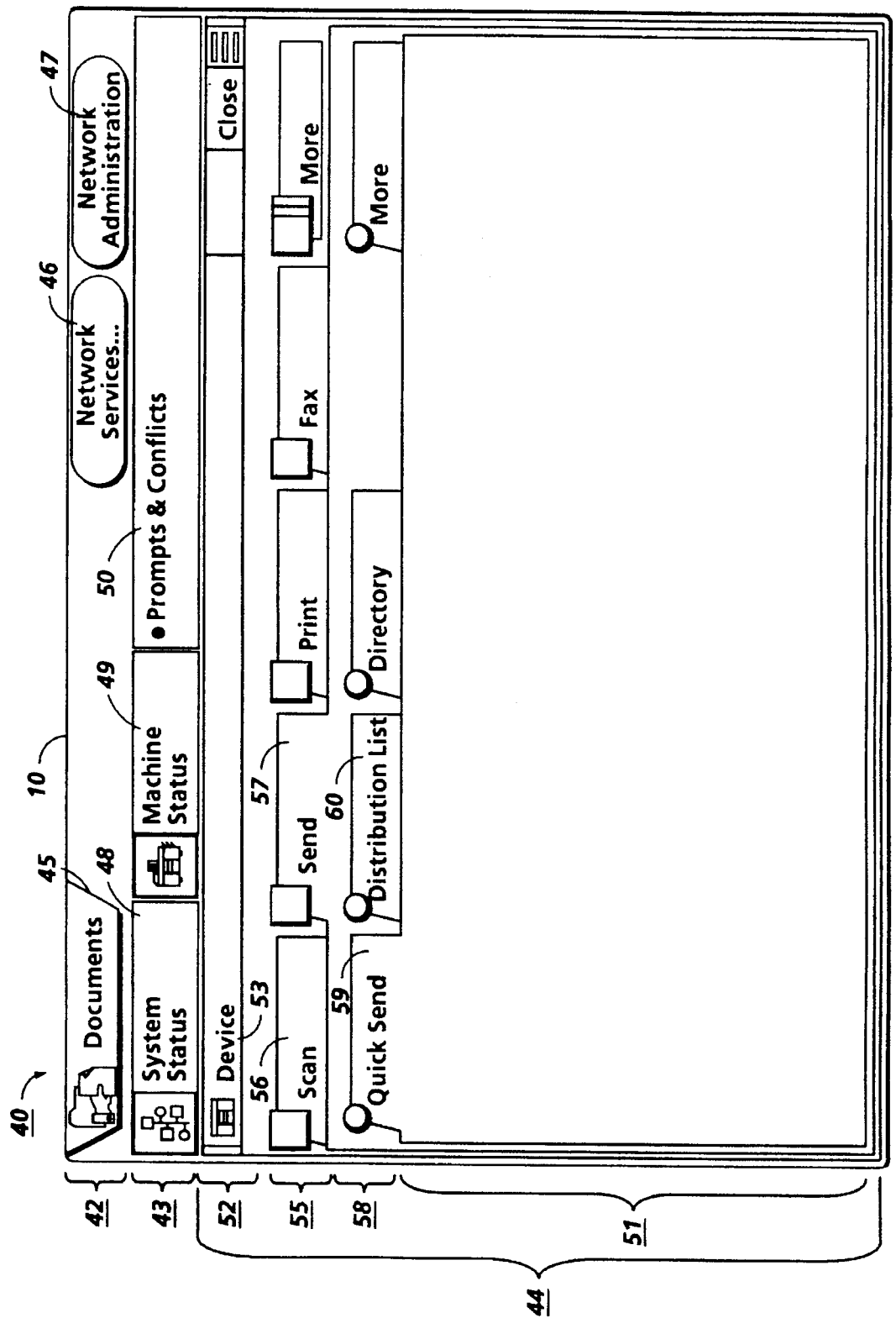
FIG. 2 is an enlarged view of a typical multi-device user interface for use on the display screens shown in FIG. 1.

FIG. 2 shows an embodiment of a multi-function device user interface 40 which is displayed on screens 10 of Work station 4, printer 11 and scanner 5. User interface (UI) 40 can operate remotely from any system; it is extensible across network services using remote windowing protocols such as X windows. For example, the user interface 40 on printer 11 is available remotely from any Work station 4 or alternate service such as scanner 5. Specifically, the user interface 40 is divided into three regions; resource bar 42, status bar 43, and service area 44. Resource bar 42 is a menu bar that provides users access to high level services that are integrated on network 24. Within the resource bar document source or suitcase 45 provides the user with a temporary storage space for documents. Suitcase 45 stores active and editable documents for easy movement across network services, or it is a transitional space where documents are stored while a user navigates through network 24.

Further, provided on resource bar 42 is network services menu 46 and network administration menu 47. Network services menu 46 provides access to any networked service such as printer 11, facsimile 13, scanner 5, file server 20 (private, shared and public file storage), database server 17, mail servers (e.g. voice mail, email, etc.) 19, ports (such as modem 26, network gateway 25), and other Work stations 4. Also, available in services area 44 are published communications channels 63 available from network admin 18. These are channels that have been provided to a utility (not shown) that manages network administration 18. These channels included in a user profile are provided by a user who is to receive data from other users on network 24. Other utilities available in network admin 18 are distribution lists, service access lists and other domain and area network services. Network administration 47 provides users with access to utilities for identification and location of profiles and services. For example, network administration 47 includes information concerning user access privileges as well as resource privileges to file server access.

Status bar 43 is divided into three dedicated message areas, system message area 48, device message area 49, programming conflicts message and prompt area 50. Text is updated in the message area 50 as system status changes. The message area 50 can be selected to reveal more detailed messages. For example, when a printer is down, the message area gives a "Printer Down" message; further selection of the message area 50 provides more detail of causes for the printer to be down. Service area 44 groups and holds related services and features as well as provides user work space 51. A selected device is identified on herald menu 52, that is, cording on menu 52 provides utilities available to the device name 53. For example, device 53 could be a network publishing system with scanning, printing or faxing facilities. Service bar 55 groups services available on service 53. For example, a user could select a service module to access a specific document service (e.g. scan 56 or send 57). Service sub bar 58 provides access to subservices within service modules. Workspace 51 provides a user area for preparing documents for distribution, which can include publication and archival.

In particular, the send service 57, which is a service displayed on service bar 55, is selected and opened on user interface 40 as shown in FIG. 2. As shown in FIG. 2, the send service 57 has sub service bar 58, with sub-services, quick-send 59 and distribution lists 60. The send service 57 provides virtual links or communication channels to other users on network 24.

Figure 3:
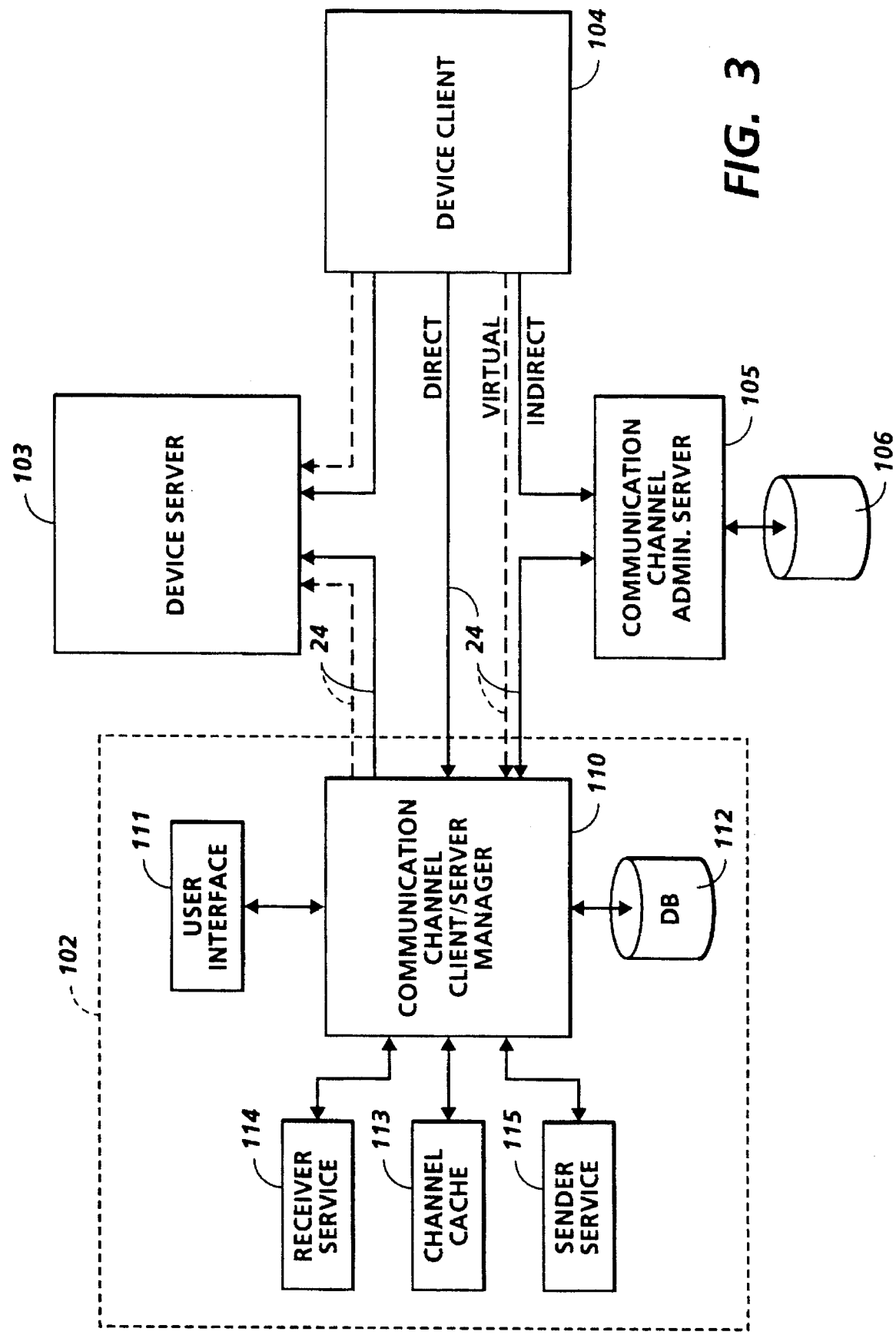
FIG. 3 shows a schematic view of a typical system architecture used in the system environment of FIG. 1.

The channel architecture is based on a client-server relationship, where client facilities are applications that are exported to the network 24, and server facilities are imported from the network. In other words, clients access exported server functionality. Thus, some services (printer, scanners, and the like) may only export or provide server functionality while using no client functionality. As a result, both the channel client and channel server may operate on the same service as well as uniquely on different services. The architecture is shown in detail in FIG. 3, where an integrated client/server system 102 is operating with stand-alone client 104, server 103 and communication channel admin server 105 that provides network administrative facilities such as storing communication channel information on disk 106.

Common to both the client and server architecture is communication channel manager 110. Manager 110 interfaces user interface 111 with network 24, local storage disk 112 and cache 113, receiver service 114 and sender service 115. Local storage available to manager 110 is in the form of long-term storage 112 (e.g. disk, floppy or tape) and short-term fast access, or cache storage, 113. Receiver service 114 provides server functionality while sender service 115 provides client functionality to manager 110. For further detail of an exemplary system, reference is made to pending application D/92365, Ser. No. 07/130,929, incorporated herein.

In accordance with the present invention, a build job technique allows an operator to compose a job from multiple image segments scattered over a network. This simplifies the compilation and printing of multi sectioned documents. In particular, an operator can easily modify or revise certain sections of the document and then print an entire revised document. Another advantage is that each section or segment can have a different format and all sections need not be retrieved to a given workstation before printing, but all sections can be forwarded directly to a selected printer or facsimile device. In particular, the multi-segment print job is assembled by an operator at any user interface on the network from multiple local and remote sources by identifying print job segments and location of segments on the network. This is accomplished by entering a start build print job function at the network interface, identifying each segment of the print job including segment location, specifying print job characteristics such as paper stock and quality for each segment, and entering an end build print job function at the network interface. Finally, there is identified a printing device on the network and suitable features relating to the entire document such as quantity are provided in order that each segment of the print job is accessed and distributed to the printing device to complete the multi-segment print job.

In accordance with the present invention, there are two methods for specifying the electronic documents which compose the build job. With the first method, the user manually enters, one at a time, each electronic document and its location at the remote UI. Using the second method, the user constructs a local ASCII file listing the documents' name and location. The user specifies the ASCII file's name to the remote UI on the Build Job request. In both methods, each electronic document's location must contain sufficient information (e.g. network address) to enable the remote UI with access to the document.

For example, assume a company is producing a manual that consists of 3 sections (A, B, C). Each section A, B and C is at a different location. To print 10 bound, page numbered copies of the entire manual, an operator on a workstation UI on the network selects Start Build Job. Then, the operator enters each job segment's information and selects Enter Segment:

segment 1: name=A, location=local, segment 2: name=B, location=Location #1, segment 3: name=C, location=Location #2

The operator then specifies the job programming for the job: output=print, quantity=10, finishing=bind, page Numbering=TRUE starting at 1, collation=TRUE. Once the programming is done, End Build Job is selected. This prompts the remote UI to submit the job to the selected printer.

Figure 4:
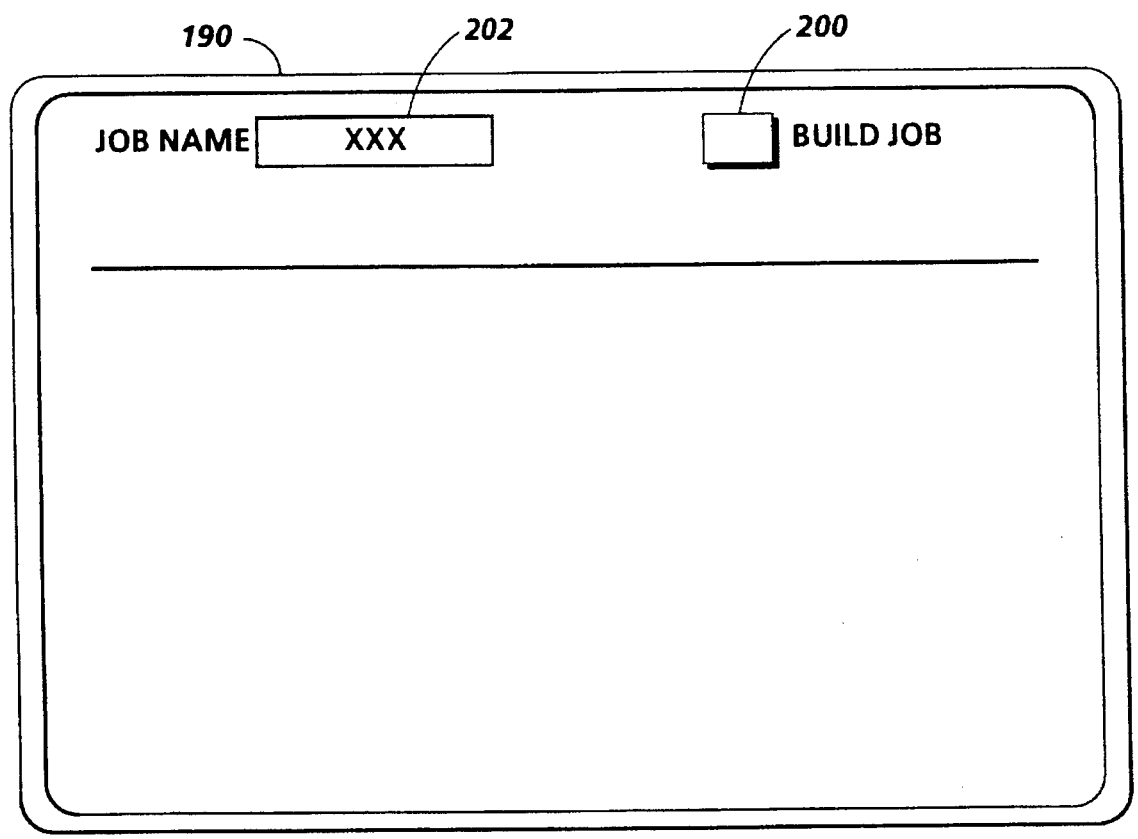
FIGS. 4 through 6 show simulated screen images for constructing a multi-segment print job from multiple local or remote sources in accordance with the present invention.
Figure 5:
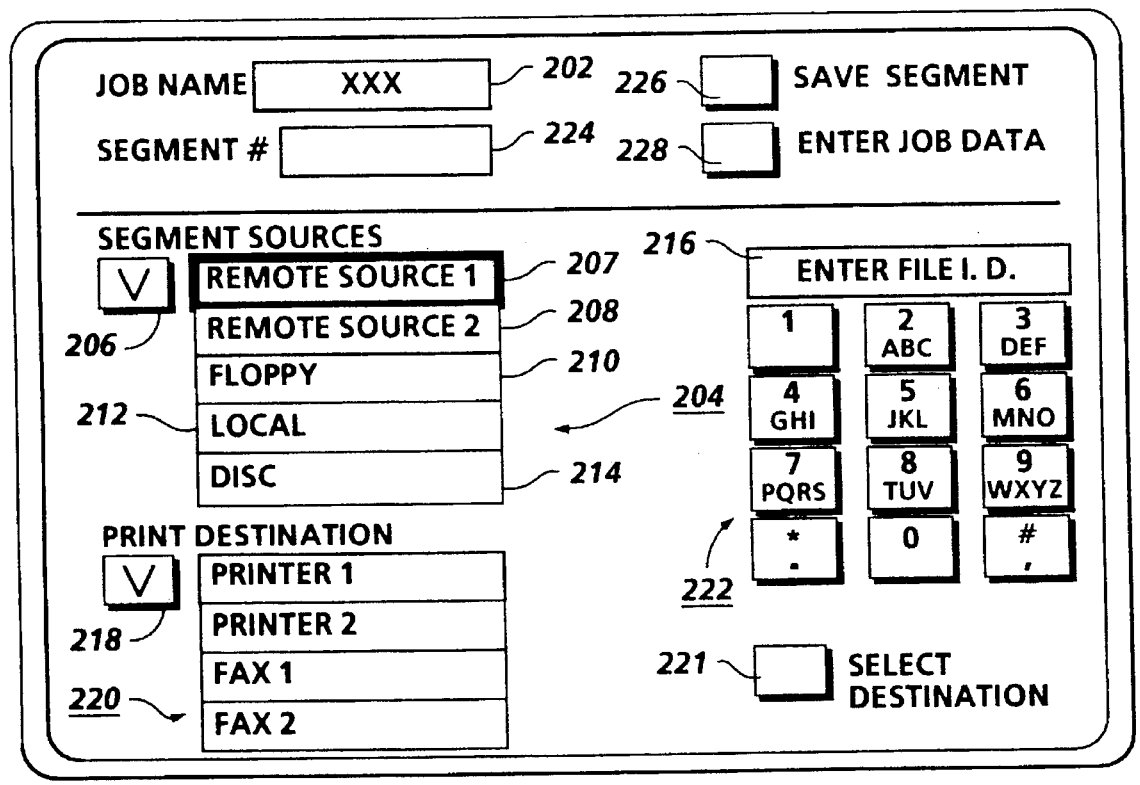

In accordance with the present invention, with reference to FIG. 4, there is disclosed a typical user interface CRT screen frame 190 displaying a build job button 200 to initiate the job compilation or job build feature. Also shown is a job name or job identification window 202. Upon activation of the Job build button 200, as shown, a subsequent screen frame in FIG. 5 illustrates segment source selector 206 with window 204 displaying several source options. Upon activation of the segment source selector 206, the various options illustrated in pull down menu 204 are scrolled or sequentially highlighted in any suitable manner to present various file or data source potentials to the operator to build or compile a required job for printing. For example, remote source #1 207, remote source #2 208, floppy disk 210, local file 212, and compact disc 214 are shown as available sources of data.

By suitably highlighting one of the selections or options in the pull down menu 204, such as illustrated with the remote source 1 option 207, the operator can select a particular segment source as part of the job to be completed. Upon highlighting a particular source such as remote source #1, the operator then identifies a particular file, set of files, or other data by using data identification keys shown at 222 to enter an appropriate file or data descriptor at window 216. When the operator is satisfied that a displayed file is desired, activation of save segment button 226 will record a flag in suitable memory for that particular displayed file to be part of the completed job.

It should be understood that various techniques of selecting data and files are contemplated within the scope of the present invention. For example, a simplified version of selecting files might be to merely enter data identifiers with keys 222 without the need to select a particular source. The system or network administrative procedure would then seek and locate the requested file. Another embodiment would be the use of a segment number window such as illustrated at 224 to track each segment or to enter by suitable keys or buttons the required sequence of printing of various randomly selected files.

At any time during the source selection procedure or after completion of the selection of data to be printed in an integrated or compiled set, the operator selects a particular printing option. In other words, the operator determines the particular printing device or facsimile device appropriate to accomplish the job requirement by use of scrolling or highlighting button 218 and displayed options in window 220. For example, window 220 displays four options for selection, Printer 1, Printer 2, Fax 1, and Fax 2. By highlighting or scrolling to a given window slot, the operator selects the particular destination by use of select destination button 221.

It should be noted that the operator can select more than one document destination. In addition, it should be noted that there are other methods of selecting destinations such as merely entering a destination code or indicator into the system by any suitable data entry device. Also, it is contemplated that a job requirement can be compiled at a remote storage or memory location on the network for later printing at the location of the storage device or printing at another designated printer on the network. In other words, selected remote files can be reproduced at different destinations or compiled at any give location for later retrieval and printing at another remote location.

Figure 6:
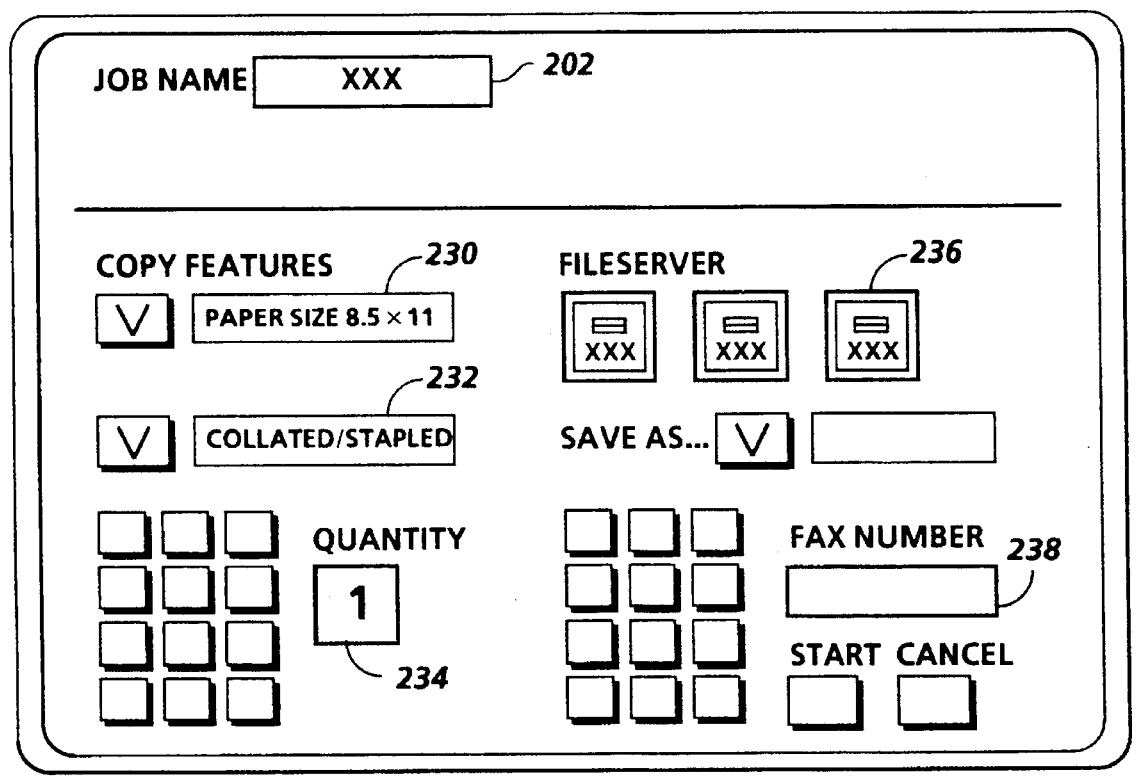

Once, the source files and printer destinations have been selected, as illustrated in FIG. 6, the appropriate options for selecting copy features are then presented on a suitable frame at the user interface. For example, the operator then is able to select features or attributes of the required job such as the size of the copy sheets in the completed set 230, the number of copies or sets 234, finishing features such as collated and stapled 232, and electronic storage at a given file server 236. The operator is also able to enter a fax number for a particular fax address for the files to be sent if a fax destination is required.

Figure 7:
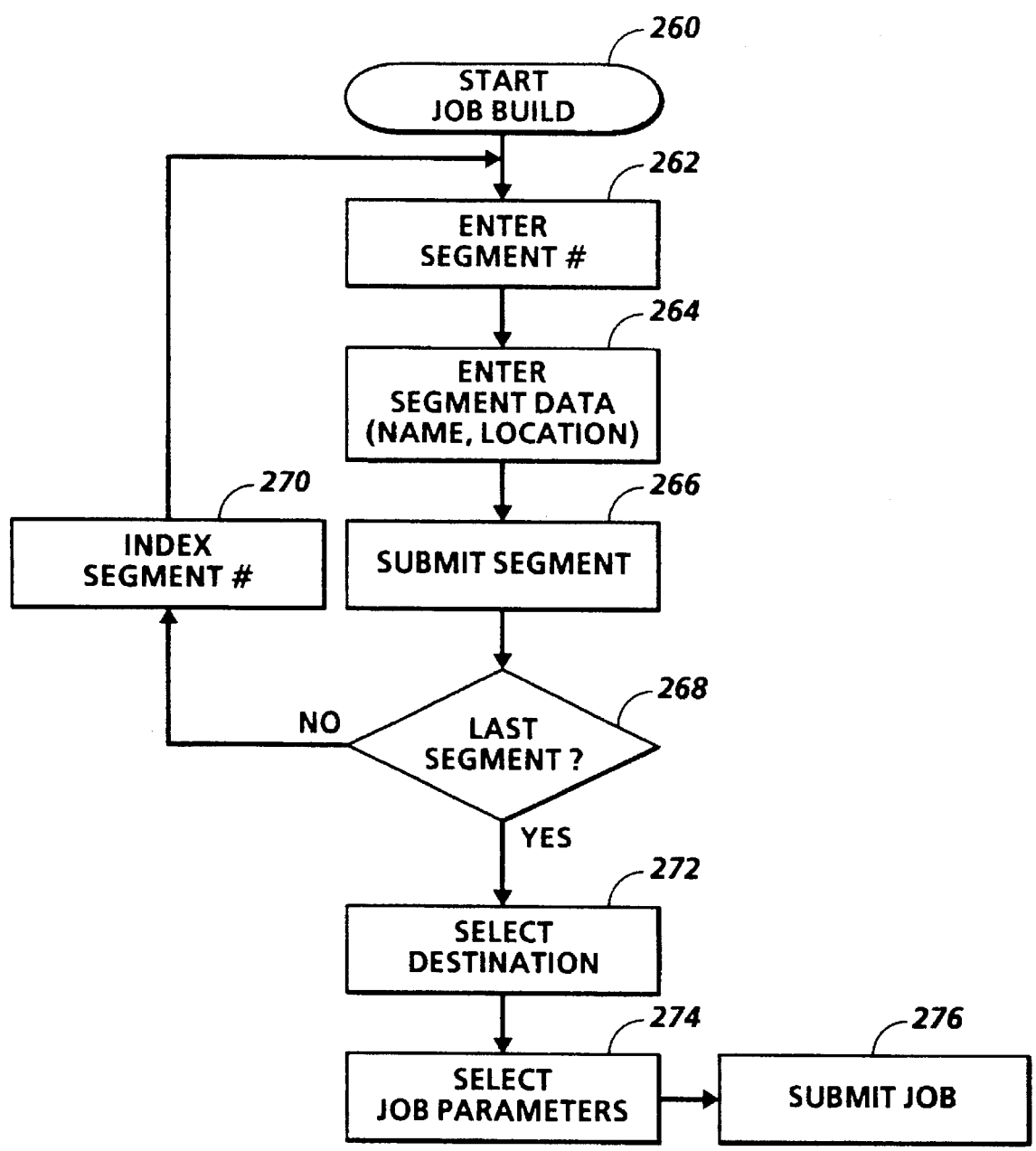
FIG. 7 is a flow chart illustrating the constructing a multisegment print job technique in accordance with the present invention.

With reference to FIG. 7, there is a flow chart illustrating the procedure in accordance with the present invention. Upon selection of the start job build button, as illustrated at block 260, the operator then identifies files or segments including identification data, location data, and printing sequence data as illustrated at blocks 262 and 264. At block 266, a particular segment is submitted. In other words, a particular segment is identified and recorded as being part of the job requirement. If additional segments are required, a decision is made to select the next file or segment as shown at block 266. This can be accomplished by indexing a segment counter to a predetermined count or simply monitoring an end of build operation switch. In any case, the operation continues with a compilation of data necessary to complete the printing operation. Upon receiving a manifestation of last segment as shown in block 268, a next logical step is to identify the destination of the selected segments or identify the printer or fax machine to accomplish the task as shown in block 272.

Finally, it is necessary to select the various job parameters or attributes required to complete the job such as quantity requirements, quality requirements, and finished mode requirements. This is illustrated in block 274. Block 276 indicates a submit job step which can be a manual activation of an end of job build button or switch or an automatic response to completed events that triggers the initiation of the compilation procedure. This includes suitable network access and search and find operations to retrieve the selected segments and deliver the segments over the network to the designated printer or fax machine. Also understood are suitable scheduling and print management functions to queue or set a particular job for completion.

While the invention has been described with reference to the structure disclosed, it is not confined to the details set forth, but it is intended to cover such modifications or changes as may come within the scope of the following claims.

I claim:

1. A method of constructing a multi-segment print job from multiple local and remote sources of job segments on a network using a network interface to identify print job segments, location of segments, and print characteristics of segments, as well as selecting a printing device comprising the steps of:

entering a start build print job function at the network interface;

selecting segment 1 of the print job including segment identification and location from a first source on the network, selecting segment 2 of the print job including segment identification and location from a second source on the network, the second source being different from the first source, continuing segment identification and location until the complete print job has been identified, specifying print job characteristics such as quantity, quality, and exception characteristics for each segment, entering an end build print job function at the network interface, and identifying a single printing device on the network to complete the multi-segment print job and assembling the print job at said printing device.

2. The method of claim 1 wherein the printing device is remote from the interface and the job segments.

3. The method of claim 1 wherein the job segments are in different formats.

4. The method of claim 1 wherein the printing device is a facsimile device.

5. A method of constructing a multi-segment print job from multiple local and remote sources on a network using a network interface to identify print job segments to compose the multi-segment print job and location of segments on the network, comprising the steps of:

entering a start build print job function at the network interface;

identifying each segment of the print job including segment location, selected segments of the print job being at different locations on the network, specifying print job characteristics such as quantity and quality for each segment, entering an end build print job function at the network interface, and identifying a single printing device on the network whereby each segment of the print job is accessed and distributed to the printing device to complete the multi-segment print job.

6. The method of claim 5 wherein the job segments are located in file servers, electronic work stations, and main memories.

7. The method of claim 5 wherein the job segments are in different formats.

8. The method of claim 7 wherein the different formats are PDL, Adobe, or ASCII.

9. The method of claim 5 wherein the step of identifying each segment of the print job including segment location includes the step of identifying print characteristics of each segment.

10. The method of claim 9 wherein the step of identifying print characteristics of each segment includes the step of identifying the quantity requirements for each segment.

11. The method of claim 9 wherein the step of identifying print characteristics of each segment includes the step of identifying the exception characteristics for each segment.

12. A network user interface with display screen for constructing a multi-segment print job from multiple sources on the network comprising:

a start build switch at the interface to initiate a start build print job function;

selectors on the display screen to identify each segment of the print job including segment location on the network, indicators on the display screen to identify print job characteristics for each segment, and a single printing device selected at the interface whereby each segment of the print job is accessed and distributed to the printing device to complete the multi-segment print job.

13. The network user interface of claim 12 wherein the network includes main memories and electronic work stations for storing print job segments.

14. The network user interface of claim 12 wherein the interface includes screen display choices for identifying print characteristics for each segment.

15. The network user interface of claim 14 wherein the print characteristics of each segment include quantity requirements for each segment.

16. The network user interface of claim 14 wherein the print characteristics of each segment include exception requirements for each segment.

17. A network user interface with display screen for constructing a multi-segment print job from multiple sources on the network comprising:

selectors on the display screen to identify each segment of the print job including segment location on the network, indicators on the display screen to identify print job characteristics for each segment, and a single printing device selected at the interface whereby each segment of the print job is accessed and distributed to the printing device.

18. The network user interface of claim 17 wherein the interface includes screen display choices for identifying print characteristics for each segment.

19. The network user interface of claim 18 wherein the print characteristics of each segment include quantity and quality requirements for each segment.

20. A method of constructing a multi-segment print job using a network interface to identify print job segments and location of segments on a network, the network including multiple devices, comprising the steps of:

identifying each segment of the print job including segment location on the network, the job segments being located in multiple devices on the network, specifying print job characteristics such as quantity for each job segment, determining that all segments of the print job have been identified for compilation into the multi-segment print job, and assembling all segments of the print job at a single location for printing on a single printer.

21. The method of claim 20 including the step of identifying a single printing device on the network whereby each segment of the print job is accessed and distributed to said printing device to complete the multi-segment print job.

22. The method of claim 21 wherein the job segments are located in file servers, electronic work stations, and main memories.

* * * * *